3,056,822
BIS(HALOALKENYL)POLYMETHYLENEBIS-(DITHIOCARBAMATES)

John J. D'Amico, Nitro, W. Va., assignor to Monsanto Chemical Company, St. Louis, Mo., a corporation of Delaware
No Drawing. Filed Sept. 22, 1958, Ser. No. 762,207
5 Claims. (Cl. 260—455)

The present invention is concerned with the fumigation of soil or growth media and is particularly directed to a method and composition for the control of soil borne pathogenic organisms which attack the underground parts of plants.

According to the present invention, it has been discovered that soil borne pathogenic organisms which attack the underground parts of plants may be controlled by impregnating soil or growth media with a fungicidal amount of a compound of the structure $$R_1S-\overset{S}{\overset{\|}{C}}-\overset{H}{\overset{|}{N}}-C_3H_5(R)-\overset{H}{\overset{|}{N}}-\overset{S}{\overset{\|}{C}}-SR_2$$

where $C_3H_5(R)$ represents an alkylene radical separating the nitrogen atoms by three carbon atoms, R representing hydrogen, lower alkyl or lower alkoxy and $R_1$ and $R_2$ represent haloalkenyl groups. In the formula $R_1$ and $R_2$ represent, more particularly,

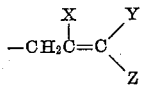

where at least one of X and Y, preferably X is halogen. Otherwise, X and Y represent hydrogen, halogen or acyclic hydrocarbon of 1–3 carbon atoms and Z represents hydrogen or halogen. The particular halogen, whether chlorine, bromine, fluorine or iodine, does not appear to be critical.

These compounds are obtainable according to known methods, for instance by condensing the salt of the corresponding dithiocarbamic acid in aqueous solution with a haloalkene. Suitable haloalkenes are 2,3-dichloro-1-propene, 2,3-dibromo-1-propene, 2,3-diodo-1-propene, 2-fluoro-3-bromo-1-propene, cis-1,2,3,-trichloro-1-propene, trans-1,2,3-trichloro-1-propene, cis-1,2,3-tribromo-1-propene and trans-1,2,3-tribromopropene. The preparation is illustrated by the following examples but they are not in any way limiting.

Example 1

To a stirred solution of 18.6 grams (0.25 mole) of trimethylene diamine and 32 grams (0.5 mole) of concentrated ammonium hydroxide in 300 ml. of water was added dropwise over a period of 15–20 minutes at 5–10° C. 38 grams (0.5 mole) of carbon bisulfide. After stirring at 25–30° C. for an hour, 55.5 grams (0.5 mole) of 2,3-dichloro-1-propene was added in one portion, causing the temperature to rise from 28 to 33° C. The reaction mixture was stirred at 25–30° C. for 24 hours and extracted with 400 ml. of ether. The ether solution was washed with water until neutral to litmus, dried over sodium sulfate and the ether removed in vacuo at 25–30° C. The bis(2-chloroallyl)trimethylene-bis(dithiocarbamate) was obtained in 80% yield as an amber oil. Analysis gave 7.7% nitrogen and 19.1% chlorine as compared to 7.5% nitrogen and 18.9% chlorine calculated for $C_{11}H_{16}Cl_2N_2S_4$.

Example 2

A solution of 18.6 grams (0.25 mole) of trimethylene diamine and 32 grams (0.5 mole) of concentrated ammonium hydroxide in 300 ml. of water was cooled to 5° C. and to it was added dropwise at 5–15° C. 38 grams (0.5 mole) of carbon bisulfide. The product was stirred for one hour at 25–30° C., 55.5 grams (0.5 mole) of 1,3-dichloropropene then added in one portion and stirring continued for 24 hours at the same temperature. The reaction mixture was then extracted with 500 ml. of ether, the ether solution washed with water until neutral to litmus and dried over sodium sulfate. The ether was removed in vacuo at a maximum temperature of 50° C. at 1–2 mm. The bis(3-chloroallyl)trimethylene-bis(dithiocarbamate) was obtained in 88% yield as an amber oil. Analysis gave 7.2% nitrogen and 33.7% sulfur as compared to 7.5% nitrogen and 34.2% sulfur calculated for $$C_{11}H_{16}Cl_2N_2S_4.$$

In a similar manner, by using the appropriate dithiocarbamic acid salt and haloalkene, the following dithiocarbamates are produced as viscous amber oils in yields varying from 65–99%.

Bis(3,3-dichloroallyl)trimethylenebis(dithiocarbamate)
Bis(cis- and trans-2,3-dichloroally)trimethylenebis-(dithiocarbamate)
Bis(3 - chloro-2,4-hexadienyl)trimethylenebis(dithiocarbamate)
Bis(3 - chloro - 2 - butenyl)trimethylenebis(dithiocarbamate)
Bis(3-chloroallyl)trimethylenebis(dithiocarbamate)
Bis(3,3-dichloroallyl) 1 - methyltrimethylenebis-(dithiocarbamate)
Bis(2-chloroallyl) 1 - methyltrimethylenebis(dithiocarbamate)
Bis(2-chloroallyl) 2 - methyltrimethylenebis(dithiocarbamate)
Bis(2-chloroallyl) 1 - methoxytrimethylenebis(dithiocarbamate)
Bis(2-chloroallyl) 2 - methoxytrimethylenebis(dithiocarbamate)

The new compounds destroy pathogenic organisms in soil at rates of 10–500 p.p.m. of infested soil. A concentration of 50 parts per million parts of soil corresponds to a dosage of 100 pounds per six-inch acre. In general, a compound should be active at 60 pounds per acre (30 p.p.m.) to be economically feasible and the new class comprise compounds active at this concentration and below.

Activity of fungicides was demonstrated against "damping off" fungi. Those present were principally pythium, rhizoctonia and fusarium species. A stock solution of the test material was pipetted into a glass jar containing one pound of infested soil. The jar was sealed and the contents thoroughly mixed by vigorous shaking. The treated soil was incubated at room temperature for 24 hours, transferred to clay pots and 5 seeds of each of 4 crop plants sown in each pot. The crop plants were Black Valentine beans, Delta Pine cotton, Straight Eight cucumber and Laxton's Progress peas. The seeded pots were then incubated at 70° F. at 98% humidity to insure activity of the organisms in the soil. 24 hours later, the pots were removed to a greenhouse and disease assessments made within 10-14 days. The percent emergence and disease incidence was recorded. The ratings were based on inoculated, untreated and uninoculated, sterile soil treatments. For convenience in recording the data, the following rating scale was used:

| Rating: | Healthy plants out of 20 |
|---|---|
| E | 18–20 |
| P | 15–17 |
| F | 12–14 |
| N—not effective | 11 or less |

The results at 60 pounds per acre are recorded below:

| Toxicant: | Soil fungicide rating |
|---|---|
| Bis(2-chloroally)trimethylenebis(dithiocarbamate) | P |
| Bis(cis- and trans-2,3-dichloroallyl)trimethylenebis(dithiocarbamate) | F |
| Bis(2-chloroallyl) 1-methyltrimethylenebis(dithiocarbamate) | P |
| Bis(2-chloroallyl)ethylenebis(dithiocarbamate) | N |
| Bis(allyl)ethylenebis(dithiocarbamate) | N |
| Bis(allyl)trimethylenebis(dithiocarbamate) | N |

It will be noted that presence of halogen and separation of the dithiocarbamyl radical by three carbon atoms are critical for soil fungicidal activity. The new fungicides possess very low phytotoxicity at effective fungicidal concentrations. For example, they may be applied directly in the furrow with cotton.

It is intended to cover all changes and modifications of the examples of the invention herein chosen for purposes of disclosure which do not constitute departures from the spirit and scope of the invention.

What is claimed is:

1. A compound of the structure

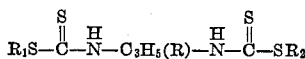

where $C_3H_5(R)$ represents an alkylene radical separating the nitrogen atoms by three carbon atoms, R being selected from the group consisting of hydrogen, lower alkoxy and lower alkyl, $R_1$ and $R_2$ are

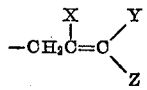

X and Y being selected from a group consisting of hydrogen, halogen and acyclic hydrocarbon of 1-3 carbon atoms, at least one of X and Y being halogen, and Z is selected from a group consisting of hydrogen and halogen.

2. A compound of the structure

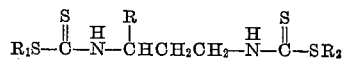

where R is a lower alkyl group and $R_1$ and $R_2$ are $-CH_2-CX=CH_2$ where X is halogen.

3. Bis(2-chloroallyl)trimethylenebis(dithiocarbamate).

4. Bis(cis- and trans-2,3-dichloroallyl)trimethylenebis(dithiocarbamate).

5. Bis(2-chloroallyl) 1-methyltrimethylenebis-(dithiocarbamate).

References Cited in the file of this patent

UNITED STATES PATENTS

| Re. 22,750 | Tisdale et al. | Apr. 30, 1946 |
| 2,588,428 | Stewart et al. | Mar. 11, 1952 |
| 2,756,249 | Kirshenbaum et al. | July 24, 1956 |
| 2,841,519 | Lo et al. | July 1, 1958 |
| 2,842,583 | Meuly | July 8, 1958 |
| 2,905,586 | Harman | Sept. 22, 1959 |

FOREIGN PATENTS

| 121,219 | Australia | Mar. 19, 1946 |
| 1,045,586 | France | July 1, 1953 |

OTHER REFERENCES

Collins et al.: J. Am. Pharm. Assn. 44, 310–313 (1955). (Copy in Scientific Library.)